(12) United States Patent
Bonapersona

(10) Patent No.: US 8,729,146 B2
(45) Date of Patent: May 20, 2014

(54) CATALYST COMPOSITION AND PROCESS USING SAME

(75) Inventor: Vittorio Bonapersona, Ferney Voltaire (FR)

(73) Assignee: Momentive Performance Materials Inc., Wilton, CT (US)

( * ) Notice: Subject to any disclaimer, the term of this patent is extended or adjusted under 35 U.S.C. 154(b) by 1145 days.

(21) Appl. No.: 11/152,427

(22) Filed: Jun. 14, 2005

(65) Prior Publication Data

US 2006/0281827 A1 Dec. 14, 2006

(51) Int. Cl.
*C08G 18/22* (2006.01)

(52) U.S. Cl.
USPC ........... 521/125; 521/107; 521/114; 521/116; 521/117; 521/130; 521/170; 528/51; 528/57; 528/85

(58) Field of Classification Search
USPC ......... 521/125, 170, 107, 114, 116, 117, 130; 528/51, 57, 85
See application file for complete search history.

(56) References Cited

U.S. PATENT DOCUMENTS

| | | | |
|---|---|---|---|
| 2,764,565 A | 9/1956 | Hoppe et al. | |
| 3,634,345 A | 1/1972 | Diehr et al. | |
| 3,705,119 A | 12/1972 | Levy et al. | |
| 3,745,133 A | 7/1973 | Comunale et al. | |
| 4,304,690 A | 12/1981 | Schulze et al. | |
| 4,334,032 A * | 6/1982 | Patton, Jr. et al. | 521/115 |
| 4,487,928 A * | 12/1984 | Richter et al. | 544/193 |
| 4,719,277 A | 1/1988 | Behnke et al. | |
| 4,900,776 A | 2/1990 | Bock et al. | |
| 5,084,485 A | 1/1992 | Heilig et al. | |
| 2004/0254279 A1 * | 12/2004 | Orchison et al. | 524/394 |

FOREIGN PATENT DOCUMENTS

| | | |
|---|---|---|
| DE | 27 32 292 | 7/1977 |
| DE | 28 32 253 | 7/1978 |
| WO | 2006138050 | 12/2006 |

OTHER PUBLICATIONS

European Office Action, Momentive Performance Materials Inc., Jul. 17, 2009.
International Preliminary Report on Patentability, Momentive Performance Materials Inc., Dec. 17, 2007.
Written Opinion of the International Search Authority, General Electric Company, Dec. 14, 2007.
International Search Report published with WO 2006138050, Dec. 28, 2006.
Chinese Office Action, Momentive Performance Materials, Inc., Mar. 25, 2010.
Chinese Office Action (Translation), Application No. 200680028104.7, Momentive Performance Materials, Inc., Dec. 28, 2010.

* cited by examiner

*Primary Examiner* — John Cooney
(74) *Attorney, Agent, or Firm* — McDonald Hopkins LLC

(57) ABSTRACT

A catalyst composition including a solution of at least one member selected from the group consisting of an alkali metal carboxylate and an alkaline earth metal carboxylate in a solvent which is nonreactive with the isocyanate groups of a polyisocyanate.

5 Claims, No Drawings

CATALYST COMPOSITION AND PROCESS USING SAME

BACKGROUND OF THE INVENTION

The present invention relates to a catalyst composition useful in the production of polyurethane containing isocyanurate, urethane, urea and/or biuret groups. The catalyst composition may also be used in the formation of a cellular polymer that is useful as thermal insulation.

Rigid foams containing urethane and predominantly isocyanurate groups (PIR foams) have been known for some time. Hydrocarbons, partially halogenated hydrocarbons and chemically generated carbon dioxide are normally used as blowing agents in the production of rigid foams.

Alkali metal carboxylates dissolved in polyols having a high OH value are typically used as catalysts in the production of rigid foams. Potassium 2-ethylhexanoate dissolved in ethylene or di-ethylene glycol, with a glycol concentration from 25 percent to 50 percent, is commonly used due to their activity and relative low cost. However, where relatively large quantities of these catalyst compositions are introduced in the production of rigid foams, the index is downshifted to such an extent that the property level of the foams is adversely affected. In particular, the dimensional stability of the foam products is seriously impaired, and the fire resistance of the polymer is reduced by the presence of urethane groups.

In U.S. Pat. No. 5,084,485, water is used to replace the high OH polyol as a solvent for an alkali carboxylate. However, this solution is not suitable for formulations employing a low level of water such as using a polyisocyanate in the formation of an insulation foam or high-density foam where the presence of a relatively large quantity of water is detrimental. In addition, the use of the catalyst composition described in U.S. Pat. No. 5,084,485 as a component for the formation of PIR foams results in undesirable properties. More particularly, a relatively large quantity of alkali metal carboxylates dissolved in at least 50 percent water used as catalysts in the production of rigid foams, as described in U.S. Pat. No. 5,084,485, results in a large amount of residual water and consequent carbon dioxide formation that adversely effects the property level of the foam product, e.g., higher friability, lower dimensional stability and thermal insulation factor due to the formation of carbon dioxide that acts as a blowing agent limiting the possibility to use other blowing agents such as hydrocarbons or hydrofluorocarbons, higher consumption of isocyanate and a decease in the ability to control the density of the foam.

Therefore, there exists a need for a catalyst composition including an alkali metal carboxylate or an alkaline earth metal carboxylate in a solution that can be employed in the production of a rigid foam which improves the property level, e.g., fire resistance and dimensional stability, of the rigid foam.

BRIEF DESCRIPTION OF THE INVENTION

In accordance with an embodiment of the present invention, a catalyst composition is provided which includes a solution of at least one member of a group consisting of an alkali metal carboxylate and an alkaline earth metal carboxylate and a solvent which is nonreactive with the isocyanate groups of a polyisocyanate.

It is an object of the present invention to provide a catalyst composition including at least one member of a group consisting of an alkali metal carboxylate and an alkaline earth metal carboxylate for the production of highly crosslinked, dimensionally stable and tough PIR foams in which the solvent for the catalyst salts does not contain any substantial amount of OH, NH or $NH_2$ functional groups that will react with an isocyanate.

It is another object of the present invention to provide a liquid catalyst composition including at least one member of a group consisting of an alkali metal carboxylate and an alkaline earth metal carboxylate that is able to reduce the dilution of isocyanurate to urethane and to improve the fire resistance and mechanical properties of a rigid foam.

It is another object of the present invention to provide a catalyst composition having a suitable viscosity to be handled at room temperature It is another object of the present invention to provide a trimerization catalyst based on a metal carboxylate such as an alkali metal carboxylate or alkaline earth metal carboxylate having improved storage stability in isocyanate or isocyanate prepolymers.

These and other objects which will be apparent to those skilled in the art are accomplished by reacting a polyisocyanate with a compound having at least two isocyanate-reactive hydrogen atoms in the presence of a catalyst compostion based on a carboxylate solution in which the carboxylate content is from about 10 percent to about 90 percent by weight. The solvent in the carboxylate solution is an alcohol-free solvent that has substantially no or no OH, NH or $NH_2$ functional groups, thereby preventing the formation of urethane links with an isocyanate and not consuming the isocyanate required for trimerization reaction. In addition, the carboxylate may be at least one member selected from the group consisting of an alkali metal carboxylate and an alkaline earth metal carboxylate. Further, the compound having at least two isocyanate-reactive hydrogen atoms may have a molecular weight ranging from about 400 to about 10,000 at an index greater than about 150.

The term index used herein relates to the degree of crosslinking of a foam. It is customary to regard a foam in which the amount of isocyanate used to produce the foam is equivalent to the stoichiometric quantity, or theoretically quantity, of isocyanate needed to produce the foam having an index of 100. Accordingly, the index is used to define the degree of undercrosslinking or overcrosslinking. The index is calculated in accordance with the following general formula: total quantity of isocyanate divided by the stoichiometric quantity of isocyanate needed by OH or NH or $NH_2$ functional groups and water of the formulation. The stoichiometric quantity of isocyanate is the sum of the weight of all reactive components of the formulation including water, divided by their respective equivalent weight and multiplied by the equivalent weight of the isocyanate. In addition, OH value is a measurement of the amount of hydroxyl groups present in a catalyst composition and is expressed as mg of KOH/gram of the catalyst composition.

DETAILED DESCRIPTION OF THE INVENTION

A catalyst composition having a solution of at least one member selected from the group consisting of an alkali metal carboxylate and alkaline earth metal carboxylate in a solvent which is nonreactive with the isocyanate groups of a polyisocyanate.

According to another embodiment of the present invention, the solvent is present in an amount of less than about 90 percent by weight of the catalyst composition. According to yet another embodiment of the present invention, water is present in an amount of less than about 25 percent by weight of the catalyst composition.

In accordance with another embodiment of the present invention, a process for forming a catalyst composition is provided which includes reacting ethylhexanoic acid with a 50 percent water solution of KOH to form a reaction mixture, adding a solvent to the reaction mixture and removing excess water from the reaction mixture including the solvent after the reaction. According to another embodiment of the present invention, a molar ratio of the ethylhexanoic acid to KOH is from about 0.9:1.0 up to about 1.1:1.0. According to yet another embodiment of the present invention, the molar ratio is from about 1.0:1.0 up to about 1.05:1.0. According to still another embodiment of the present invention, the removal of the excess water from the reaction mixture is performed using distillation under vacuum. According to yet another embodiment of the present invention, the temperature of the process can be maintained at below about 80° C.

In accordance with yet another embodiment of the present invention, a catalyst composition having a solution of at least one member selected from the group consisting of an alkali metal carboxylate and alkaline earth metal carboxylate in a solvent which is nonreactive with the isocyanate groups of a polyisocyanate and water which is present in an amount of less than about 25 percent by weight of the catalyst composition, wherein the solvent is present in an amount of less than about 90 percent by weight of the catalyst composition.

According to another embodiment of the present invention, the amount of water present in the final catalyst composition is less than about 5 weight percent. According to another embodiment of the present invention, the amount of water present in the final catalyst composition is less than about 4.5 weight percent. According to yet another embodiment of the present invention, the amount of water present in the final catalyst composition is less than about 3.5 weight percent.

The present invention also relates to a catalyst composition for the production of rigid foams containing urethane and predominantly isocyanurate groups obtained by reacting a) at least one polyisocyanate with b) at least one compound having at least two isocyanate-reactive hydrogen atoms in the presence of a c) a catalyst composition having a solution comprising at least one member selected from the group consisting of an alkali metal carboxylate and an alkaline earth metal carboxylate in a solvent which is nonreactive with the isocyanate groups of a polyisocyanate and d) a blowing agent. In accordance with another embodiment of the present invention, the carboxylate is present in an amount of less than 90 percent by weight of the catalyst composition. In accordance with yet another embodiment of the present invention, water may also be present in an amount of less than about 25 percent by weight of the catalyst composition. In addition, other known auxiliaries and additives may be employed in the production of the rigid foams. The blowing agent may be water, a hydrocarbon, a gas, a hydrochlorofluorocarbon, a hydrofluorocarbon or any combination thereof. This reaction may be carried out at an index above about 150. According to another embodiment of the present invention, the index is in the range of from about 170 to about 400. Optionally, a chain-extending and/or crosslinking agent having at least two isocyanate-reactive hydrogen atoms and a molecular weight from about 32 to about 399 may be present in the catalyst composition. According to yet another embodiment of the present invention, the at least one compound having at least two isocyanate-reactive hydrogen atoms may have a molecular weight of from about 400 to about 10,000.

According to another embodiment of the present invention, a solution including an alkali metal carboxylate or an alkaline earth metal carboxylate in a solvent having substantially no or no OH, NH or $NH_2$ functional groups is used as trimerization catalyst. According to another embodiment of the present invention, the carboxylate is present in the range from about 10 percent to about 90 percent by weight based on the total weight of the solution. According to yet another embodiment of the present invention, the carboxylate is present in the range from about 10 percent to about 80 percent by weight based on the total weight of the solution. According to still another embodiment of the present invention, the carboxylate may be a sodium carboxylate, a potassium carboxylate or a calcium carboxylate.

According to another embodiment of the invention, the amount of carboxylate present in the catalyst composition is from about 50 percent to about 80 percent by weight based on the total weight of the solution, the amount of solvent present in the in the catalyst composition is from about 20 percent to about 50 percent by weight based on the total weight of the solution and the amount of residual water present in the catalyst composition is less than about 25 percent by weight based on the total weight of the solution. According to another embodiment of the present invention, the OH value of the catalyst composition is less than about 20 mg of KOH/gram of the final catalyst composition.

The carboxylate may be derived from a linear or cyclic carboxylic acid or polycarboxylic acid such as formic acid, acetic acid, propionic acid, 3-chloropropionic acid, pivalic acid, butyric acid, g-aminobutyric acid, valeric acid, acrylic acid, cinnamic acid, crotonic acid, oleic acid, benzoic acid, 2-hydroxybenzoic acid, p-aminobenzoic acid, p-methylbenzoic acid, naphthoic acid, cyclopentanecarboxylic acid, 3,3-dimethylcyclohexanecarboxylic acid, oxalic acid, malonic acid, succinic acid, glutaric acid, adipic acid, maleic acid, fumaric acid, phthalic acid, isophthalic acid and terephthalic acid. According to another embodiment of the present invention, the carboxylic acid contains at least one carboxylic group and has a molecular weight ranging from about 46 to about 2000.

Alternatively, the carboxylate may be derived from a carboxylic or polycarboxylic acid having 1 or more hydroxyl groups. According to another embodiment of the present invention, the carboxylate may be potassium lactate, potassium ricinoleate and potassium dimethylolpropionate.

According to another embodiment of the present invention, the carboxylate is an octoate such as lithium caprylate, sodium caprylate, potassium caprylate, calcium caprylate, lithium 2-ethylhexanoate, sodium 2-ethylhexanoate, calcium 2-ethylhexanoate or potassium 2-ethylhexanoate. According to another embodiment of the present invention, the carboxylate is potassium 2-ethylhexanoate.

The solvent used in the solution of the embodiments of the present invention may be an aprotic solvent or a chemical compound having no or substantially no OH, NH and/or $NH_2$ functional groups. The aprotic solvent may be a methoxyether; an ester including acetates, adipates, and pthalates; a ketone; a phosphate ester or a tertiary amine. These solvents replace polyol type solvents having a high degree of OH groups generally used in the production of polyurethane or polyisocyanurates. In addition, the solvents used in a solution, in accordance with the present invention, may also provide a solution having a low viscosity suitable for in the production of polyurethane or polyisocyanurates According to another embodiment of the present invention, the solvent includes functional groups that are nonreactive with isocyanate groups during a chemical reaction. According to another embodiment of the present invention, the aprotic solvent may be a dialkyl sulfoxide, a N,N-dialkylalkanoamide, an aryl or alkyl phosphonate, a trialkyl phosphate, an organic carbonate, a tertiary amine, a ketone or any combination thereof. According to another embodiment of the present invention, the solvent is di-ethyl-ethyl-phosphonate, tetramethylenesulfone, 1-methyl-2-pyrrolidinone, triethylphosphate, tributylethylphosphate, acetonitrile, dimethylcarbonate, dimethylbenzylamine, dimethylaminopropylhexahydrotriazine, pentamethyl diethylenamine, di-isobutylchetone, methyl n-amyl ketone or any combination thereof.

Alternatively, the solvent may be an ether having substantially no free hydroxyl groups. According to another embodiment of the present invention, the solvent is an ester having substantially no free hydroxyl groups derived from a mono, di- or poly-carboxylic acid with a monol, diol, triol or glycol ether, a triglyceride derived from an aliphatic or aromatic acid with glycerol, an amide having substantially no free —NH groups derived from an aliphatic or aromatic carboxylic acid with an amine or any combination thereof. The solvent may also be a silane or siloxane polyalkyleneoxide copolymer having substantially no free hydroxyl groups.

According to another embodiment of the present invention, the catalyst composition may include an alkali metal carboxylate or an alkaline earth metal carboxylate in an amount of from about 10 percent to about 90 percent by weight based on the total weight of the solution. According to yet another embodiment of the present invention, the carboxylate is present in an amount of from about 10 percent to about 80 percent by weight based on the total weight of the solution. According to still another embodiment of the present invention, the carboxylate is present in an amount of from about 50 percent to about 80 percent by weight based on the total weight of the solution.

According to another embodiment of the present invention, the catalyst composition may include the solvent in an amount of from about 10 percent to about 90 percent by weight based on the total weight of the solution. According to yet another embodiment of the present invention, the solvent is present in an amount of from about 20 percent to about 90 percent by weight based on the total weight of the solution. According to still another embodiment of the present invention, the solvent is present in an amount of from about 20 percent to about 50 percent by weight based on the total weight of the solution.

The catalyst composition of the present invention may also contain water from the formation of a carboxylate, wherein the water is present in an amount below about 25 percent by weight based on a total weight of the catalyst composition. According to another embodiment of the present invention, the amount of water present in the catalyst composition is less than about 5 percent by weight.

According to another embodiment of the present invention, the OH value of the catalyst composition is less than about 20 mg KOH/gram. According to yet another embodiment of the present invention, the OH value of the catalyst composition is less than about 10 mg/gram of the catalyst composition.

According to another embodiment of the present invention, the catalyst composition having a solution of at least one member selected from the group consisting of an alkali metal carboxylate and an alkaline earth metal carboxylate in water which is present in an amount in the range of about 10 to about 25 percent by weight of the catalyst composition, wherein the carboxylate is present in an amount in the range of about 75 to about 90 percent by weight of the catalyst composition.

According to another embodiment of the present invention, the catalyst composition having a solution of at least one member selected from the group consisting of an alkali metal carboxylate and an alkaline earth metal carboxylate in a solvent which is nonreactive with isocyanate groups of a polyisocyanate, wherein the solvent is present in an amount in the range of about 10 to about 25 percent by weight of the catalyst composition, and wherein the carboxylate is present in an amount in the range of about 75 to about 90 percent by weight of the catalyst composition.

The blowing agent may be a hydrocarbon, a gas, a hydrochlorofluorocarbon, a hydrofluorocarbon or any combination thereof. According to another embodiment of the present invention, the blowing agent is isopentane, n-pentane, cyclopentane, isobutene, nitrogen, air, carbon dioxide, HCFC-141b, HCFC-142b, HCFC-22, HFC-134a, HFC-152a, HFC-245fa, HFC-245ca, HFC-236ea, HFC-365mfc, and the like, tetramethylsilane or any combination thereof. According to yet another embodiment of the present invention, the blowing agent is a perfluoroalkane, an ester, an acetal, a ketone or any combination thereof. According to still another embodiment of the present invention, the blowing agent is isopentane, n-pentane, cyclopentane, isobutane, HCFC-141b, 245fa, HFC-365mfc, HFC-134a or any combination thereof.

The catalyst composition of the present invention may be added to an isocyanate, an isocyanate prepolymer or a polyol component.

The catalyst composition of the present invention may also be employed in a polyurethane or polyisocyanurate formulation in which the catalyst composition is present in an amount of from about 0.3 percent to about 10 percent based on the total weight of the polyurethane or polyisocyanurate formulation.

Alternatively, the alkali metal carboxylate may be an octoate. According to another embodiment of the present invention, the alkali metal carboxylate is potassium 2-ethylhexanoate. Further, the alkali metal carboxylate content of the solution may be from about 10 percent to about 90 percent by weight. According to yet another embodiment of the present invention, the alkali metal carboxylate content is from about 10 to about 80 percent by weight. According to still another embodiment of the present invention, the alkali metal carboxylate content is from about 50 to about 80 percent by weight.

Any of the polyisocyanates conventionally employed in the art of preparing polyisocyanurate foams can be employed in the foam reaction mixtures discussed above. According to another embodiment of the present invention, polyisocyanates known as polymethylene polyphenyl polyisocyanates can be employed in the foam reaction mixtures discussed above. According to another embodiment of the present invention, polymethylene polyphenyl polyisocyanates may include from about 20 percent to about 85 percent by weight of methylenebis(phenyl isocyanate) and the remainder of the mixture may be polymethylene polyphenyl polyisocyanates having a functionality greater than about 2.0. A detailed description of these polyisocyanates and methods for their preparation may be found in U.S. Pat. No. 3,745,133, which is incorporated herein by reference in its entirety.

According to another embodiment of the present invention, any organic polyisocyanate may be used in the process of the present invention. Suitable polyisocyanates include aromatic, aliphatic, heterocyclic, araliphatic and cycloaliphatic polyisocyanates and any combination thereof. Examples of useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methyl-phenyl-2,4-phenyl diisocyanate, 4,4'-diphenyl-methane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenyl-methane-2,2', 5,5'-tetraisocyanate and the polymethylene polyphenylpolyisocyanates. According to another embodiment of the present invention, the polyisocyanate is polymethylene polyphenyl polyisocyanate, meta or para phenylene diisocyanate, hexamethylene diisocyanate, toluene diisocyanate and diphenylmethane diisocyanate.

The isocyanates useful for the production of rigid foams may be of the type described, for example, by W. Siefken in Justus Liebigs Annalen der Chemie, 562, pages 75 to 136, for example those corresponding to the formula $Q(NCO)_n$ in which n=2 to 4 and Q is an aliphatic hydrocarbon radical containing 2 to 18 carbon atoms, a cycloaliphatic hydrocarbon radical containing 4 to 15 carbon atoms, an aromatic hydrocarbon radical containing 6 to 15 carbon atoms or an araliphatic hydrocarbon radical containing 8 to 15 carbon atoms. According to an embodiment of the present invention, n in the formula $Q(NCO)_n$ is equal to 2. According to another embodiment of the present invention, the aliphatic hydrocarbon radical contains 6 to 10 carbon atoms. According to yet another embodiment of the present invention, the cycloaliphatic hydrocarbon radical contains 5 to 10 carbon atoms. According to still another embodiment of the present invention, the aromatic hydrocarbon radical contains 6 to 13 carbon atoms. According to still yet another embodiment of the present invention, the araliphatic hydrocarbon radical contains 8 to 13 carbon atoms.

Specific examples of such polyisocyanates are given in German Offenlegungsschrift 2,832,253, pages 10 to 11. Alternatively, the polyisocyanate may also be a mixture of 2,4-toluene diisocyanate or 2,6-toluene diisocyanate ("TDI") and polyphenyl polymethylene polyisocyanates of the type produced by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates"). The modified polyisocyanates may be derived from a 2,4-toluene diisocyanate and/or 2,6-toluene diisocyanate or from a 4,4'-diphenyl methane diisocyanate and/or 2,4-diphenyl methane diisocyanate.

Compounds having at least two isocyanate-reactive hydrogen atoms and a molecular weight of from 400 to about 10,000 may be useful in the process of the present invention. These compounds may include compounds containing amino groups, thiol groups, and carboxyl groups. According to another embodiment of the present invention, the compounds contain hydroxyl groups. According to yet another embodiment of the present invention, the compounds include 2 to 8 hydroxyl groups, especially those having a molecular weight in the range from about 1,000 to about 6,000. According to still another embodiment of the present invention, the molecular weight is in the range from about 2,000 to about 6,000.

Polyethers, polyesters, polycarbonates and polyester amides containing at least 2 hydroxyl groups are examples of the types of isocyanate reactive compounds which may be employed in the process of the present invention, e.g., the production of homogeneous and cellular polyurethanes. Specific examples of these known compounds are given in German Offenlegungsschrift 2,832,253, pages 11-18. According to another embodiment of the present invention, the polyethers, polyesters, polycarbonates and polyester amides contain 2 to 8 hydroxy groups. According to yet another embodiment, the polyethers, polyesters, polycarbonates and polyester amides contain 2 to 6 hydroxyl groups. According to still another embodiment of the present invention, the polyethers, polyesters, polycarbonates and polyester amides have an OH value from about 28 to about 56. According to still yet another embodiment of the present invention, any combination of the polyethers, polyesters, polycarbonates and polyester amides described above can be used.

Alternatively, compounds containing at least two isocyanate-reactive hydrogen atoms and having a molecular weight from about 32 to about 399 may be included in the reaction mixture during the process of the present invention. These compounds may contain hydroxyl groups and/or amino groups and/or thiol groups and/or carboxyl groups. According to another embodiment of the present invention, these compounds are compounds containing hydroxyl groups and/or amino groups, which serve as chain extending agents and/or crosslinking agents. These compounds may contain from 2 to 8 isocyanate-reactive hydrogen atoms. According to another embodiment of the present invention, these compounds contain from 2 to 4 isocyanate-reactive hydrogen atoms. Specific examples of these compounds are given in German Offenlegungsschrift 2,832,253, pages 10-20.

Similarly, any of the polyols conventionally employed in the production of polyisocyanurate foams can be employed in the foam reaction mixture in accordance with this invention. Such polyols include polyether and polyester polyols having functionalities from 2 to 6 and molecular weights ranging from about 60 up to about 1000 or higher. While polyols having higher molecular weights can be employed, the polyols tend to be solids or highly viscous liquids and are accordingly less desirable because of handling and miscibility considerations.

In accordance with another embodiment of the present invention, the polyols are employed in a foam forming reaction mixture in amounts in the range of about 0.01 equivalents to about 0.4 equivalents per equivalent of polyisocyanate. A detailed description and exemplification of such polyols is given in U.S. Pat. No. 3,745,133, which is incorporated herein by reference in its entirety.

In the present invention, the reaction components, including the novel catalyst composition, may be reacted by any known single-stage process, e.g., the prepolymer process or the semiprepolymer process. Machines such as those described in U.S. Pat. No. 2,764,565 may be used. In addition, any known laminator process may also produce rigid foams containing urethane and predominantly isocyanate groups. Particulars of other processing machines which may also be used in the practice of the present invention are given in Kunststoff-Handbuch, Vol. VII, edited by Vieweg and Hochtlen, Carl Hanser Verlag, Munchen 1966, for example on pages 121-205.

In accordance with another embodiment of the present invention, all of the components are reacted at an index above about 150. According to yet another embodiment of the present invention, all of the components are reacted at an index of from about 170 to about 300.

The rigid foams containing urethane and predominantly isocyanurate groups produced in accordance with the present invention may be used, for example, as insulating materials, particularly in the building industry.

According to another embodiment of the present invention, a polyurethane or polyisocyanurate foam composition may further comprise optional known additives such as activators, catalysts or accelerators, colorants, pigments, dyes, crosslinking/chain-extending agents, surfactants, fillers, stabilizers, antioxidants, plasticizers, flame retardants and the like.

For example, fillers may include conventional organic and inorganic fillers and reinforcing agents. More specific examples include inorganic fillers, such as silicate minerals, for example, phyllosilicates such as antigorite, serpentine, homblends, amphiboles, chrysotile, and talc; metal oxides, such as aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers. According to another embodiment of the present invention, the inorganic and organic fillers may be used individually or as mixtures.

Optional auxiliaries and additives which may be employed in the process of the present invention include readily volatile organic substances which act as further blowing agents; known reaction accelerators and reaction retarders; surface-active additives, such as emulsifiers and foam stabilizers; known cell regulators such as paraffins or fatty alcohols or dimethyl polysiloxanes; pigments; dyes; known flame retarding agents such as diphenyl cresyl phosphate, tricresyl phosphate; stabilizers against the effects of aging and weathering; plasticizers; fungistatic and bacteriostatic agents; and also fillers, such as barium sulfate, kieselguhr, carbon black or whiting.

Specific examples of these optional auxiliaries and additives are described, for example, in German Offenlegungsschrift 2,732,292, pages 21-24. Other examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and details on the use of such additives and the way in which they work can be found in Kunststoff-Handbuch, Vol. VII, edited by Vieweg and Hochtlen, Carl Hanser Verlag, Munchen, 1966, for example on pages 103 to 113.

Examples of suitable flame retardants are tricresyl phosphate, tris(2-chloroethyl)phosphate, tris(2-chloropropyl) phosphate, and tris(2,3-dibromopropyl)phosphate. A suitable flame retardant in compositions of the present invention comprises FYROL PCF®, which is a tris(chloro propyl)phosphate, available from Akzo Nobel Functional Chemicals.

In addition to the above-mentioned halogen-substituted phosphates, it is also possible to use inorganic or organic flame retardants, such as red phosphorus, aluminum oxide hydrate, antimony trioxide, arsenic oxide, ammonium polyphosphate (EXOLIT® from Clariant) and calcium sulfate, expandable graphite or cyanuric acid derivatives, e.g., melamine, or mixtures of two or more flame retardants, e.g., ammonium polyphosphates and melamine, and, if desired, corn starch, or ammonium polyphosphate, melamine, and expandable graphite and/or, if desired, aromatic polyesters.

According to another embodiment of the present invention, UV performance enhancers, or UV light stabilizers, may be included in the form reaction mixtures to prevent the breakdown and loss of chemical and physical properties in the composite structure due to UV light. According to another embodiment of the present invention, the UV performance enhancers include Tinuvin® 1130 and Tinuvin® 292 from Ciba. Of course, any other UV performance enhancers available from Ciba or any other equivalent suppliers may be included. In addition, other UV performance enhancers may include, but are not limited to, Tinuvin® 123 and Tinuvin® 900 from Ciba.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

The following examples are set forth to illustrate the present invention and should not be construed to limit its scope. In the examples, all parts and percentages are by weight unless otherwise indicated.

COMPARATIVE EXAMPLES 1-2 AND EXAMPLES 3-10

Comparative Examples 1-2 are catalyst compositions commercially available from Pelron Corporation and Air Products and Chemical, Inc., respectively.

Example 3 was prepared using the following procedure: 144.2 grams of 2-ethylhexanoic acid was mixed in a flask with 112.2 grams of a 50 percent water solution of KOH and stirred for 10 minutes. 65.5 grams of DMSO was then added to the reaction mixture, and water was removed from the reaction mixture by distillation under vacuum until about 3.5 percent of water remained in the catalyst composition. The catalyst composition obtained was a clear solution.

Example 9 was prepared using the following procedure: 147.1 grams of 2-ethylhexanoic acid was mixed in a flask with 112.2 grams of a 50 percent water solution of KOH and stirred for 10 minutes. 65.5 grams of di-isobutyl-adipate was then added to the reaction mixture, and water was removed from the reaction mixture including di-isobuty-adipate by distillation under vacuum until about 3.5 percent of water remained in the catalyst composition. The catalyst composition obtained was a clear solution.

Examples 3-8 and 10 were prepared using the same procedures described above with respect to Example 3 except that a different solvent was employed in each of the examples.

The composition of Comparative Examples 1-2 and Examples 3-10 are listed in Table 1 below. The OH value is the measurement of the amount of hydroxyl groups present in a catalyst composition and is expressed as mg of KOH/gram of the catalyst composition.

TABLE 1

| Catalyst Composition | Components |
|---|---|
| Comparative Example 1 | 70% potassium 2-ethylhexanoate, 27% ethylene glycol and 3% water (Pelcat ® 9865 available from Pelron having an OH valve of 485 and viscosity of 2500 cPs @25° C.) |
| Comparative Example 2 | 70% potassium 2-ethylhexanoate, 27% di-ethylene glycol and 3% water (DABCO ® K-15 available from Air Product having an OH valve of 285 and a viscosity of 6500 cPs @ 25° C.) |

TABLE 1-continued

| Catalyst Composition | Components |
|---|---|
| Example 3 | 70% potassium 2-ethylhexanoate, 27% dimethylsulfoxide and 3% water (OH value of 0 and a viscosity of 1200 cPs @25° C.) |
| Example 4 | 70% potassium 2-ethylhexanoate, 27% triethylphosphate and 3% water (OH value of 0.7 and viscosity of 3500 cPs @25° C.) |
| Example 5 | 70% potassium 2-ethylhexanoate, 27% di-isobutylketone and 3% water (OH value of 0 and viscosity of 4000 cPs @25° C.) |
| Example 6 | 70% potassium 2-ethylhexanoate, 27% butyl carbitol acetate and 3% water (OH value of 5.3 and viscosity of 3000 cPs @25° C.) |
| Example 7 | 70% potassium 2-ethylhexanoate, 27% PEG (400) di-oleate and 3% water (OH value of 6.6 and viscosity of 12000 cPs @25° C.) |
| Example 8 | 70% potassium 2-ethylhexanoate, 27% PEG (400) di-2ethylhexanoate and 3% water (OH value of 4.4 and viscosity of 15000 cPs@25° C.) |
| Example 9 | 70% potassium 2-ethylhexanoate, 27% di-isobutyl-adipate and 3% water (OH value of 3.0 and viscosity of 5500 cPs @25° C.) |
| Example 10 | 70% potassium 2-ethylhexanoate, 27% Solvent DBE ® (Dibasic esters produced from the dibasic acids-adipic, glutaric and succinic-which are all naturally occurring materials, available from Invista) and 3% water (OH value of 1.5 and viscosity of 1000 cPs @25° C.) |

COMPARATIVE FORMULATION EXAMPLE 11 AND FORMULATION EXAMPLES 12-18

These formulation examples are related to the making of rigid foams. The specific catalyst compositions, materials and amounts used to produce the rigid foams and the results from testing the foams are listed in Table 2 below.

Procedure: all formulations ingredients except for the isocyanate were stirred in a container until a homogeneous mixture was obtained. The isocyanate was then added to the homogeneous mixture and stirred for 7 seconds with a propeller at 5000 r.p.m. The reaction mixture was then immediately poured into a 20×20×20 cm wooden box where the expansion and cure of the foams took place. Foam properties were measured after 24 hours.

TABLE 2

| Formulation # | Comparative Formulation Example 11 | Formulation Example 12 | Formulation Example 13 | Formulation Example 14 | Formulation Example 15 | Formulation Example 16 | Formulation Example 17 | Formulation Example 18 |
|---|---|---|---|---|---|---|---|---|
| TERATE ® 2541 (aromatic polyester polyol available from Invista), grams | 82.6 | 82.6 | 82.6 | 82.6 | 82.6 | 82.6 | 82.6 | 82.6 |
| Water, grams | 0.6 | 0.6 | 0.6 | 0.6 | 0.6 | 0.6 | 0.6 | 0.6 |
| Niax ® C-5 (amine catalyst available from GE advanced materials), grams | 0.2 | 0.2 | 0.2 | 0.2 | 0.2 | 0.2 | 0.2 | 0.2 |
| TCPP ® (flame retardant available from Akzo), grams | 8.2 | 8.2 | 8.2 | 8.2 | 8.2 | 8.2 | 8.2 | 8.2 |
| Niax ® Silicone L-5107 (foam stabilizer available from GE advanced materials), grams | 1.6 | 1.6 | 1.6 | 1.6 | 1.6 | 1.6 | 1.6 | 1.6 |
| Solkane ® 365mfc (blowing agent available from Solvay), grams | 24 | 24 | 24 | 24 | 24 | 24 | 24 | 24 |
| Total Weight, grams | 117.2 | 117.2 | 117.2 | 117.2 | 117.2 | 117.2 | 117.2 | 117.2 |

| Catalyst composition | Comparative Example 1 | Example 3 | Example 4 | Example 5 | Example 6 | Example 7 | Example 8 | Example 9 |
|---|---|---|---|---|---|---|---|---|
| catalyst composition, pbw | 3 | 3 | 3 | 3 | 3 | 3 | 3 | 3 |
| Voranate ® M 229 (polymeric MDI available from DOW chemicals) | 138 | 138 | 138 | 138 | 138 | 138 | 138 | 138 |
| NCO index | 2.23 | 2.36 | 2.36 | 2.36 | 2.36 | 2.36 | 2.36 | 2.36 |
| Compressive strength perpendicular to foam rise kPa (normalized @ 35 kg/m3) | 92.7 | 103.4 | 103.0 | 107.0 | 108.8 | 108.8 | 111.1 | 108.9 |
| Butler chimney Percentage weight retained | 86.6% | 90.2% | 92.4% | 90.9% | 90.9% | 91.3% | 90.8% | 93.1% |

It was observed that the foams produced using Formulations 12-18 with the catalyst compositions of Examples 3 to 9, respectively, had increased compressive strength and retained more weight after the burn test than the foam produced using Comparative Formulation Example 11 with the catalyst composition of Comparative Example 1.

COMPARATIVE FORMULATION EXAMPLES 19-20 AND FORMULATION EXAMPLES 21-26

A series of foams were produced using the same procedures and reactants as were described and used above with respect to Comparative Formulation 11 and Formulation Examples 12-18 with the exception of a different aromatic polyester polyol, blowing agent and in some cases a different catalyst composition. The specific catalyst compositions, materials and amounts used to produce the foams of Comparative Formulation Examples 19-20 and Formulation Examples 21-26 and the results from testing the foams are listed in Table 3 below.

TABLE 3

| Formulation # | Comparative Formulation Example 19 | Comparative Formulation Example 20 | Formulation Example 21 | Formulation Example 22 | Formulation Example 23 | Formulation Example 24 | Formulation Example 25 | Formulation Example 26 |
|---|---|---|---|---|---|---|---|---|
| Stepanpol ® PS 2412 (aromatic polyester polyol available from Stepan inc.), grams | 80 | 80 | 80 | 80 | 80 | 80 | 80 | 80 |
| Niax ® C-5 (amine catalyst available from GE advanced materials), grams | 0.2 | 0.2 | 0.2 | 0.2 | 0.2 | 0.2 | 0.2 | 0.2 |
| Water, grams | 0.7 | 0.7 | 0.7 | 0.7 | 0.7 | 0.7 | 0.7 | 0.7 |
| Niax ® Silicone L-6900 (foam stabilizer available from GE advanced materials), grams | 0.8 | 0.8 | 0.8 | 0.8 | 0.8 | 0.8 | 0.8 | 0.8 |
| n-pentane, grams | 12 | 12 | 12 | 12 | 12 | 12 | 12 | 12 |

| Catalyst composition | Comparative Example 1 | Comparative Example 2 | Example 3 | Example 4 | Example 5 | Example 6 | Example 7 | Example 10 |
|---|---|---|---|---|---|---|---|---|
| catalyst composition, pbw | 4 | 4 | 4 | 4 | 4 | 4 | 4 | 4 |
| Voranate ® M 229 (polymeric MDI available from DOW chemicals), grams | 172.0 | 172.0 | 172.0 | 172.0 | 172.0 | 172.0 | 172.0 | 172.0 |
| NCO index | 2.74 | 2.83 | 2.97 | 2.97 | 2.97 | 2.97 | 2.97 | 2.97 |
| Compressive strength perpendicular to foam rise kPa (normalized @ 35 kg/m3) | 107.7 | 105.3 | 113.7 | 114.5 | 126.4 | 119.6 | 120.9 | 118.6 |
| Butler chimney Percentage weight retained | 84.8% | 85.6% | 88.8% | 88.2% | 89.0% | 87.5% | 87.9% | 90.0% |

It was observed that the foams produced using Formulation Examples 21-26 with the catalyst compositions of Examples 3 to 7 and 10, respectively, had increased compressive strength and retained more weight after the burn test than the foams produced using Comparative Formulation Examples 19-20 with the catalyst compositions of Comparative Examples 1-2, respectively.

While exemplary embodiments have been shown and described, it will be understood by those skilled in the art that various modifications and substitutions may be made thereto without departing from the spirit and scope of the invention. Accordingly, it is to be understood that the present invention has been described by way of illustrations and not limitation.

What is claimed is:

1. A polyurethane or polyisocyanurate formulation comprising from about 0.3 percent to about 10 percent based on the total weight of the polyurethane or polyisocyanurate formulation of a catalyst composition, the catalyst composition comprising a solution comprising (a) at least one of a carboxylate chosen from an alkali metal carboxylate and an alkaline metal carboxylate, (b) a solvent that is nonreactive with the isocyanate groups of a polyisocyanate, and (c) water present in an amount of less than 25 percent by weight of the catalyst composition, wherein the solvent comprises an adipate is present in an amount of less than about 90 percent by weight of the catalyst composition.

2. A polyurethane or polyisocyanurate formulation using from about 0.3 percent to about 10 percent based on the total weight of a polyurethane or polyisocyanurate formulation of a catalyst composition, the catalyst composition comprising a solution comprising (a) at least one of a carboxylate chosen from an alkali metal carboxylate and an alkaline metal carboxylate, and (b) a solvent that is nonreactive with the isocyanate groups of a polyisocyanate, wherein the carboxylate is lithium caprylate, sodium caprylate, potassium caprylate, calcium caprylate, lithium 2-ethylhexanoate, sodium 2-ethylhexanoate, calcium 2-ethylhexanoate or potassium 2-ethylhexanoate, and the solvent comprises an adipate.

3. A polyurethane foam containing urethane and isocyanurate groups obtained by reacting at least one polyisocyanate with at least one compound having at least two isocyanate-reactive hydrogen atoms in the presence of a catalyst composition having a solution comprising (a) at least one member selected from the group consisting of an alkali metal carboxylate and an alkaline earth metal carboxylate, and (b) a solvent which is nonreactive with the isocyanate groups of the polyisocyanate, wherein the solvent comprises an adipate.

4. A polyurethane or polyisocyanurate formulation comprising from about 0.3 percent to about 10 percent based on the total weight of the polyurethane or polyisocyanurate formulation of a catalyst composition, the catalyst composition comprising a solution comprising (a) at least one carboxylate, (b) a solvent that is nonreactive with the isocyanate groups of a polyisocyanate, and (c) water present in an amount of less than 25 percent by weight of the catalyst composition, wherein the at least one carboxylate includes at least potassium 2-ethylhexanoate, the solvent comprises at least polyethylene glycol di-2-ethylhexanoate, and the solvent is present in an amount of less than about 90 percent by weight of the catalyst composition.

5. A polyurethane foam containing urethane and isocyanurate groups obtained by reacting at least one polyisocyanate with at least one compound having at least two isocyanate-reactive hydrogen atoms in the presence of a catalyst composition having a solution comprising (a) at least one member selected from the group consisting of an alkali metal carboxylate and an alkaline earth metal carboxylate, and (b) a solvent which is nonreactive with the isocyanate groups of the polyisocyanate, wherein the at least one carboxylate includes at least potassium 2-ethylhexanoate, and the solvent comprises at least polyethylene glycol di-2-ethylhexanoate.

* * * * *